United States Patent
You et al.

(10) Patent No.: US 7,436,908 B2
(45) Date of Patent: Oct. 14, 2008

(54) UWB TRANSCEIVING APPARATUS AND METHOD FOR DYNAMICALLY REDUCING INTERFERENCE

(75) Inventors: Ho-jeong You, Suwon-si (KR); In-hwan Kim, Suwon-si (KR); Nam-hyong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 825 days.

(21) Appl. No.: 10/828,258

(22) Filed: Apr. 21, 2004

(65) Prior Publication Data
US 2004/0223535 A1    Nov. 11, 2004

(30) Foreign Application Priority Data
May 7, 2003    (KR) .................. 10-2003-0029130

(51) Int. Cl.
*H04L 27/06*    (2006.01)
(52) U.S. Cl. .................. 375/340; 375/147; 375/256; 455/161.3; 455/176.1; 455/226.2
(58) Field of Classification Search .................. 375/130, 375/140, 141, 147, 256, 316, 340; 455/150.1, 455/154.1, 161.1–161.3, 168.1, 176.1, 178.1, 455/180.1, 180.2, 226.1, 226.2, 226.3, 227; 370/537, 464, 465
See application file for complete search history.

(56) References Cited

U.S. PATENT DOCUMENTS

| | | | |
|---|---|---|---|
| 5,677,927 A | | 10/1997 | Fullerton et al. |
| 7,099,368 B2 * | | 8/2006 | Santhoff et al. ............. 375/130 |
| 7,286,599 B1 * | | 10/2007 | Cheah ........................ 375/238 |
| 2004/0258133 A1 * | | 12/2004 | Lee et al. |
| 2005/0105594 A1 * | | 5/2005 | Giannakis et al. |
| 2007/0165740 A1 * | | 7/2007 | Koslar et al. |

FOREIGN PATENT DOCUMENTS

| | | |
|---|---|---|
| EP | 1 292 043 A1 | 3/2003 |
| EP | 1 398 882 A2 | 3/2004 |

(Continued)

OTHER PUBLICATIONS

Somayazulu V S et al. Institute of Electrical and Electronics Engineers: "Design challenges for very high data rate UWB systems" Conference Record of the 35TH. Asilomar Conference on Signals, Systems, & Computers. Pacfic Groove, CA, Nov. 3-6, 2002, Asilomar Conference on Signals, Systems and Computers, New York, NY, vol. 1 of 2 Conf. 36, Nov. 3, 2002, pp. 717-721, XP010638299.

(Continued)

*Primary Examiner*—Dac V Ha
(74) *Attorney, Agent, or Firm*—Sughrue Mion, PLLC (57) ABSTRACT

A UWB receiver having at least one communication module with a limited working band whose on/off state can be controlled. The UWB receiver is adapted to detect power intensity of a received radio signal in the limited working band based on an on/off state of said at least one communication module. The UWB receiver is adapted to control the on/off state of the at least one communication module based on a result of the detection.

19 Claims, 7 Drawing Sheets

FOREIGN PATENT DOCUMENTS

| | | |
|---|---|---|
| JP | 4-91528 A | 3/1992 |
| JP | 9-294091 A | 11/1997 |
| JP | 09-294091 A | 11/1997 |
| JP | 2003-46411 A | 2/2003 |
| JP | 2003-051761 A | 2/2003 |
| JP | 2003-51761 A | 2/2003 |
| JP | 2004-159302 A | 6/2004 |

OTHER PUBLICATIONS

Miller T., et al: "RFI Suppression for Ultra Wideband Radar" IEEE Transactions on Aerospace and Electronic Systems, IEEE Inc. New York, US, vol. 33, No. 4, Oct. 1, 1997, pp. 1142-1156, XP000726070.

Chinese Office Action dated Sep. 22, 2006 issued in Chinese Patent Application No. 200410036708.9.

* cited by examiner

UWB TRANSCEIVING APPARATUS AND METHOD FOR DYNAMICALLY REDUCING INTERFERENCE

BACKGROUND

This application claims the priority of Korean Patent Application No. 10-2003-0029130 filed on May 7, 2003, in the Korean Intellectual Property Office, the disclosure of which is incorporated herein by reference.

1. Field

This disclosure teaches techniques related to an RF transceiver apparatus including a receiver unit with a low noise amplifier (LNA) and a filter, and a transmitter unit with a power amplifier and a filter, and a UWB signal transceiving method. More particularly, the teachings relate to techniques for overcoming interference which may be produced in a frequency band overlapped with a frequency band of radio communications currently used in an RF transceiver apparatus using ultra wide band (UWB) technology.

2. Description of the Related Art

Figure 1:
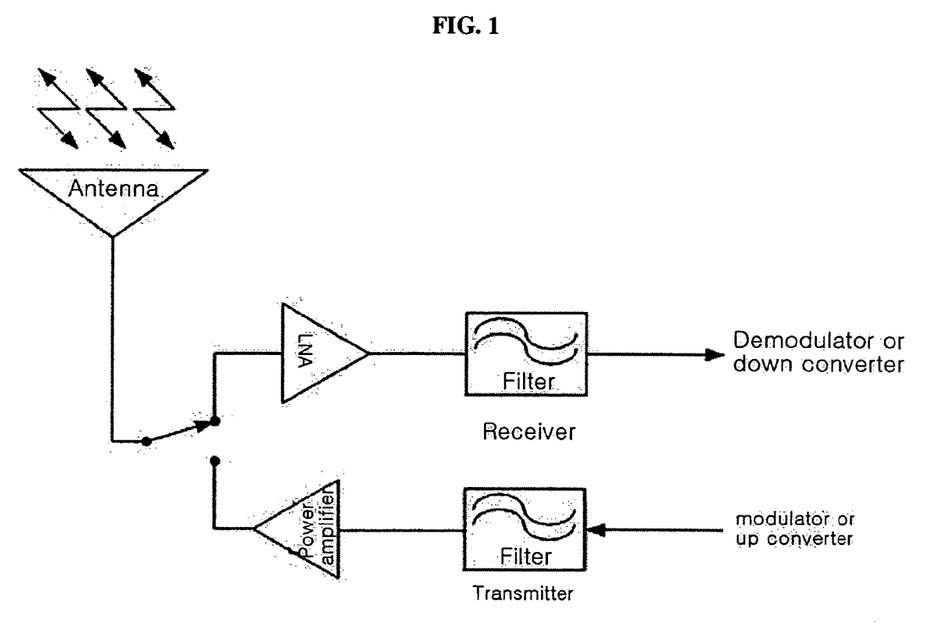
FIG. 1 is a schematic diagram showing the configuration of a conventional RF transceiver apparatus.

FIG. 1 is a schematic diagram showing a related art radio frequency (RF) transceiver apparatus. As shown in FIG. 1, when the RF system is in receive mode, a switch is connected to an input terminal of a low noise amplifier (LNA). RF signals input to an antenna connected to the LNA are transmitted to a filter via the LNA. The RF signals are transmitted further to a down converter via the filter when a carrier is used with the system. In case if no carrier is used, the RF signals are transmitted directly to a demodulator.

When the RF system is in transmit mode, the switch is connected to an output terminal of a power amplifier. When a carrier is used, the signals after passing through an up converter and a filter are amplified in the power amplifier. They are then transmitted, as electrical energy, into space through the antenna. When a carrier is not used, modulated signals are amplified in the power amplifier after passing through the filter. They are then transmitted through the antenna.

Increasingly, wireless communication system available for use in a number of wireless local area network (WLAN) and wireless personal area network (WPAN) require data transmission rates as high as those used in wired communication system. Such a need is met only if a UWB (ultra wide band) is used. UWB has a data rate that is the highest among currently used WLAN or WPAN wireless communication systems. Since a bandwidth of at most 200 to 300 MHz is generally employed in such a related art RF transceiver apparatus, it is not so difficult to construct the LNA, the power amplifier and the filter. Further, since a specific predetermined narrow band is used, the band rarely interferes with the other systems.

However, several problems are encountered if an UWB system having a bandwidth of several hundred MHz or GHz is used. An acute problem in using the UWB is that the UWB uses predetermined frequency bands that are already used by other commercial wireless communication systems. There is a strong possibility that a malfunction in the UWB system may be produced in a specific frequency band overlaps with that used by the other radio communication systems, because signal power thereof is low and receiver sensitivity is also accordingly low. Further, since the LNA, the power amplifier, the filter, and the like, which are used in a UWB system, should cover the broad bandwidth, they cannot exhibit good performance throughout the entire frequency band of interest. As a result, some problems such as signal distortion may occur in some frequencies.

Therefore, there is a need for an apparatus that can cause a UWB system not to interfere with, or not to be interfered by, wireless communication systems operating adjacent to the UWB system.

SUMMARY

To overcome some of the disadvantages discussed above, there is provided a UWB receiver comprising at least one communication module with a limited working band whose on/off state can be controlled. The UWB receiver is adapted to detect power intensity of a received radio signal in the limited working band based on an on/off state of said at least one communication module. The UWB receiver is adapted to control the on/off state of the at least one communication module based on a result of the detection.

In a specific enhancement, the detected power intensity corresponds to a band that comprises a frequency at which interferences is expected.

In another specific enhancement, the receiver has a baseband controller adapted to control the on/off states of said at least one communication module, to detect the power intensity of the radio receive signals, and to control the on/off state of said at least one communication module.

More specifically, an MAC is provided for storing information on the detected band and transmit the stored information on the band to other UWB receivers.

More specifically, the information on the band is transmitted through a management frame.

More specifically, the band is stored in a physical layer header.

In another specific enhancement the at least one communication module comprises a band stop filter.

In another specific enhancement, the at least one communication module comprises a small signal amplifier.

Another aspect of the disclosed teachings is a UWB transmitter, comprising at least one communication module with limited working bands whose on/off states can be controlled. The UWB transmitter controls the on/off states of the at least one communication module to filter out a radio transmission signal in a corresponding band.

Yet another aspect of the disclosed teachings is a UWB transceiver, comprising at least one communication module. The UWB transceiver is adapted to detect power intensity of a radio receive signal by bands according to on/off states of the at least one communication module with a predetermined limited working bands. It is further adapted to control the on/off states of the at least one communication module based on the detection result, to filter out a radio receive/transmission signal in a corresponding band.

Yet another aspect of the disclosed teachings is a method of receiving UWB signals, comprising detecting power intensity of a radio receive signal according to on/off states of at least one communication module with a limited working band. The on/off state of the at least one communication is controlled in accordance with the detection result. The radio receive signal in the band are filtered out.

Yet another aspect of the disclosed teachings is a method of transmitting UWB signals, comprising: controlling on/off state of at least one communication module and filtering out a radio transmission signal in a band.

Specifically controlling the on/off state of at least one communication module further includes setting on/off state of the communication module and making an agreement on the determination result with at least one other communicating UWB receiver.

More specifically the making an agreement on the determination result includes storing information on the determination result and transmitting the stored information to the other UWB receiver.

Still another aspect of the disclosed teachings is a method of transceiving UWB signals, comprising detecting power intensity of a radio receive signal according to on/off states of at least one communication module with limited working band. The on/off states of the at least one communication module is controlled in accordance with the detection result. A radio receive/transmission signal in a band is filtered out.

BRIEF DESCRIPTION OF THE DRAWINGS

The above features and advantages of the disclosed teachings will become apparent from the following description of example implementations given in conjunction with the accompanying drawings, in which.

DETAILED DESCRIPTION

Hereinafter, example implementations of the disclosed teachings are described in detail with reference to accompanying drawings.

Figure 2:
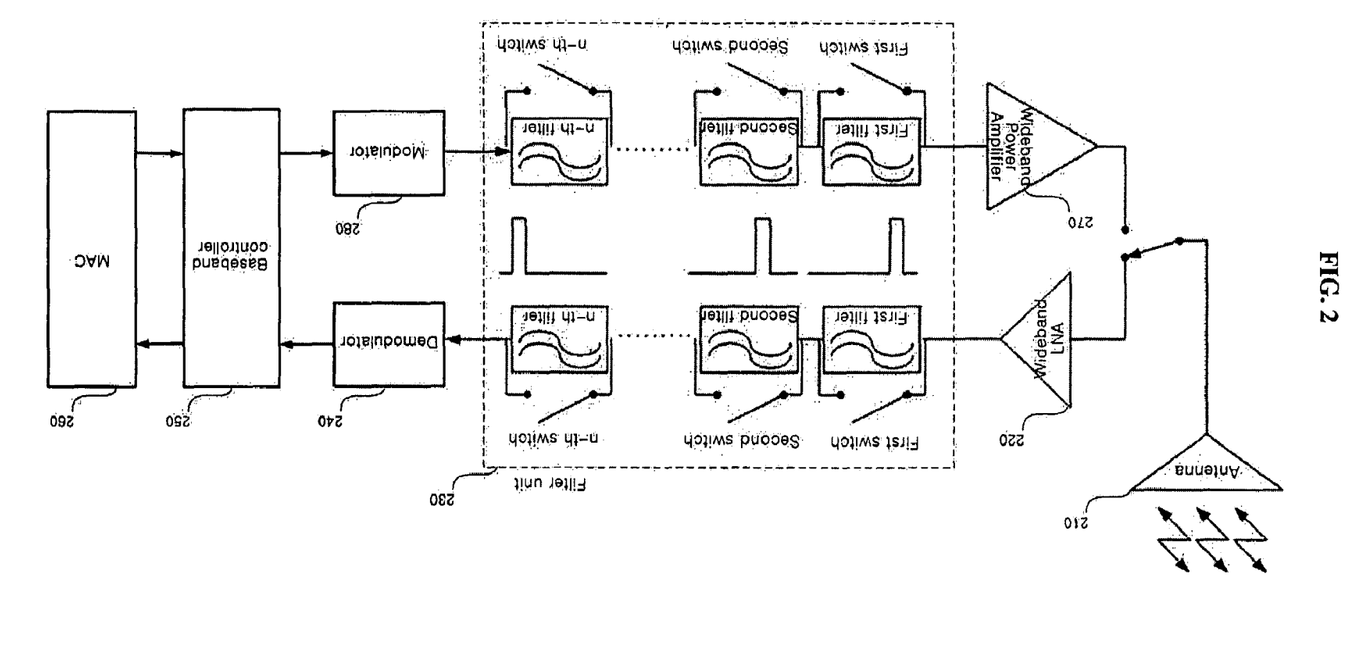
FIG. 2 is a block diagram illustrating a non-limiting exemplary configuration of a UWB transceiver apparatus including a filter unit having a plurality of filters by frequency bands.

FIG. 2 is a block diagram that shows a non-limiting example of a configuration of a UWB transceiver apparatus. It includes a filter unit having a plurality of filters, each of which is capable of filtering a specific frequency band according to the disclosed teachings. Referring to FIG. 2, the UWB transceiver has a wideband LNA 220 covering all frequency bands of a UWB system, a wideband power amplifier 270, a filter unit 230 including a plurality of filters, a demodulator 240, a modulator 280, a baseband controller 250, and a medium access control (MAC) 260.

Each of the components of the apparatus will now be described in detail. The LNA is a typical small signal amplifier. An example of a small signal amplifier is an RF device that is needed for converting a signal. Such a signal, while interpretable, has increased noise and weakened intensity as the signal passes through a number of paths in the air. The small signal amplifier is an amplifier that receives not only gain but also the noise component. In this example, a wideband LNA covering all the frequency bands of the UWB system is used.

Each of the filters constituting the filter unit is a band stop filter for selectively filtering out only a specific frequency band used in existing RF systems. Each of the band stop filters is required to filter out a specific frequency spectrum when a signal is input to the UWB receiver. Because specific frequency bands are filtered out, the UWB system does not interfere with existing wireless communication systems.

Further, it is likely that new frequency bands that may overlap with the existing frequencies may appear due to the advent of new communication devices. The band stop filter is required to dynamically cope with interference due to such newly overlapped band. For example, the filters may be arranged according to ranges of the frequency band used in the existing wireless communication systems in such a manner that a first band stop filter is used in the global positioning system (GPS) band and a second band stop filter is used in the 5 GHz wireless LAN band, etc.

A switch that can be turned on or off is attached in a parallel connection format to each filter. In this configuration, if the switch is in an ON state, the signal input is transmitted only along the shorted switch without passing through the filter with predetermined impedance. Thus, the band stop filter is in an OFF state. On the other hand, if the switch is in an OFF state, the input signal is transmitted through the filter with predetermined impedance. Thus, the band stop filter is in an ON state.

Figure 3:
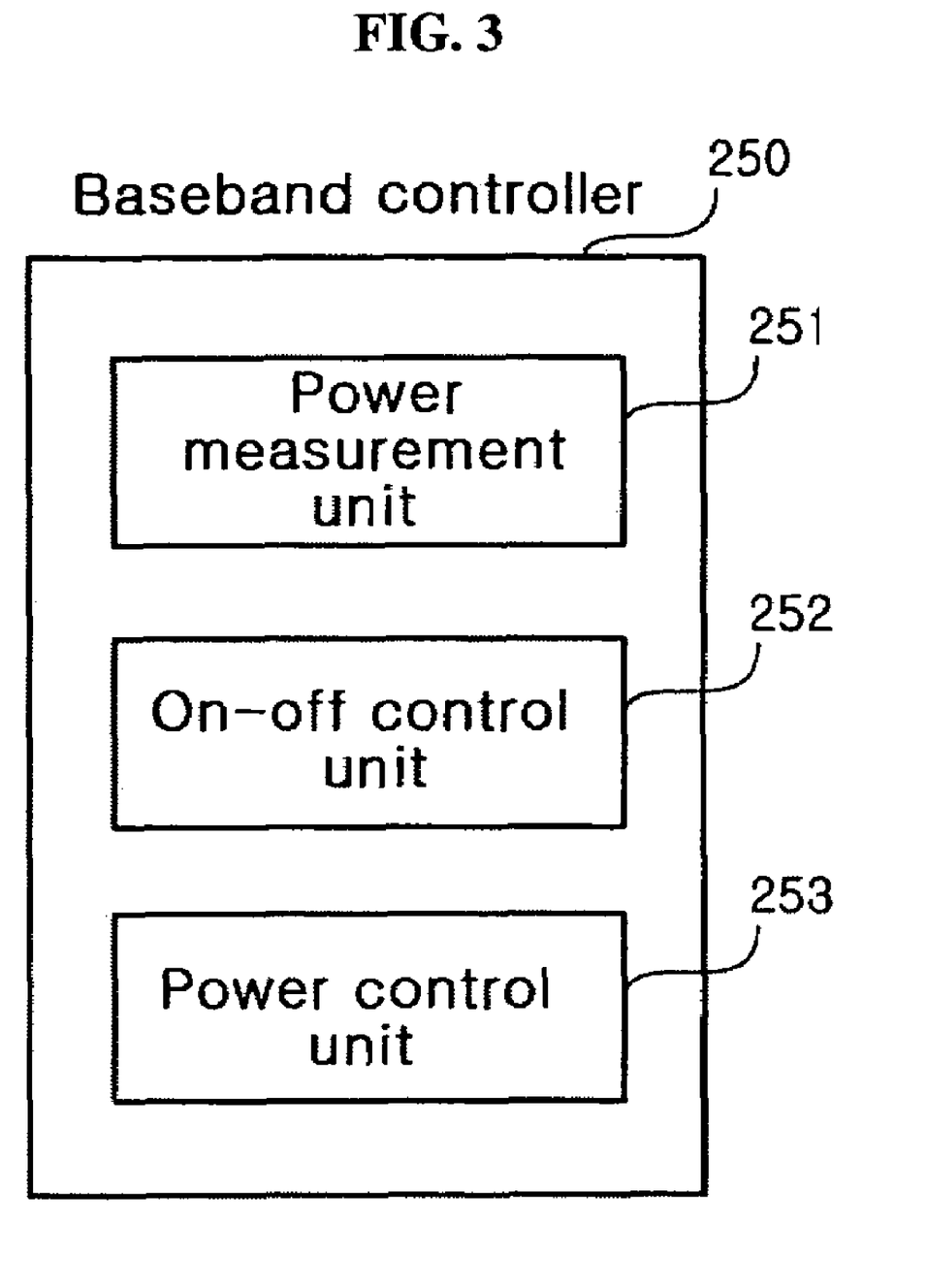
FIG. 3 is a schematic diagram showing a structure of a baseband controller embodying some aspects of the disclosed teachings.

The baseband controller 250 serves to control the overall operation of processing transmission and reception of UWB pulse signals through the transceiver. As shown in FIG. 3, the baseband controller 250 comprises a power measurement unit 251, an on-off control unit 252 and a power control unit 253. The functions of the components will be later described in detail with reference to FIG. 3.

The MAC 260 is present in the upper layer of the physical layer and serves to manage data communication according to the UWB communication. The MAC 260 receives binary signals through the baseband controller or transfers the binary signals to be transmitted to the baseband controller. Further, the demodulator 240 serves to demodulate a data sequence of UWB pulse signals received through the antenna into original signals. The modulator 280 modulates binary data of the original signals into UWB pulse signals. The power amplifier 270 amplifies the intensity of the UWB pulse signals input from the modulator 280 via the filter so that they are suitable for UWB channel transmission.

In the receiving side of the apparatus, the order between the filter and LNA may be changed and all the filters may be located in front or to the rear of the LNA. In case of a heterodyne system or direct conversion system where the carrier is used, the signals may be moved to the baseband of the original signals. These signals are then demodulated if the signals pass through the down converter. On the other hand, in case of a baseband system or UWB system where the carrier is not used, the signals may be directly demodulated without passing through the down converter.

In the transmitting side of the apparatus, the order between the filter and power amplifier may be changed, and all the filters may be located in front of or to the rear of the power amplifier. In case of a heterodyne system or direct conversion system where a carrier is used, the modulated baseband signals are up-converted into the band around the carrier frequency. Here, the up-converted RF signals have a band that is to be sent to a specific band space. In a system where a carrier is not used, the modulated signals are directly sent to the filter without performing the up-conversion process.

FIG. 3 is a schematic diagram showing an exemplary structure of the baseband controller 250 embodying some aspects of the disclosed teachings. The power measurement unit 251 of the baseband controller 250 measures the power intensity of the RF signal entering the band space as each of the filters is turned on or off, thereby turning on or off each of the corresponding LNAs. As a result of the measurement, if there is power variation greater than a predetermined value, the power measurement unit 251 determines that another wireless communication system is using the band.

The on-off control unit 252 serves to filter out signals in the band that are not to be used. This is done by controlling the turning on or off each of the filters. More specifically, the on-off control unit 252 can dynamically turn on or off the switch by turning on the band stop filter corresponding to a band, which is determined to be used by the other wireless communication system in the power measurement unit 251, and turning off other band stop filters. Further, the on-off control unit 252 serves to filter out signals in the band that are not to be used, by controlling the operation of turning on or off each of the LNAs. More specifically, the on-off control unit 252 can dynamically turn on or off the switch by turning off the LNA corresponding to a band that has been determined to be used by the other wireless communication systems in the power measurement unit 251, and turning on the other LNAs.

Further, the power control unit 253 controls the intensity of the transmission power of the UWB pulse signals according to the signal to noise ratio (SNR) of the received signals. Since the respective components of the baseband controller 250 so constructed operate independently from one another, additional components may be added thereto depending on the data transmission method or only some of the components shown in FIG. 3 may be included therein. For example, the baseband controller 250 may be comprised of only the power measurement unit 251 and the on-off control unit 252. If there is an additional need to control the intensity of the transmission power, the power control unit 253 may be further added to the baseband controller 250.

Figure 4:
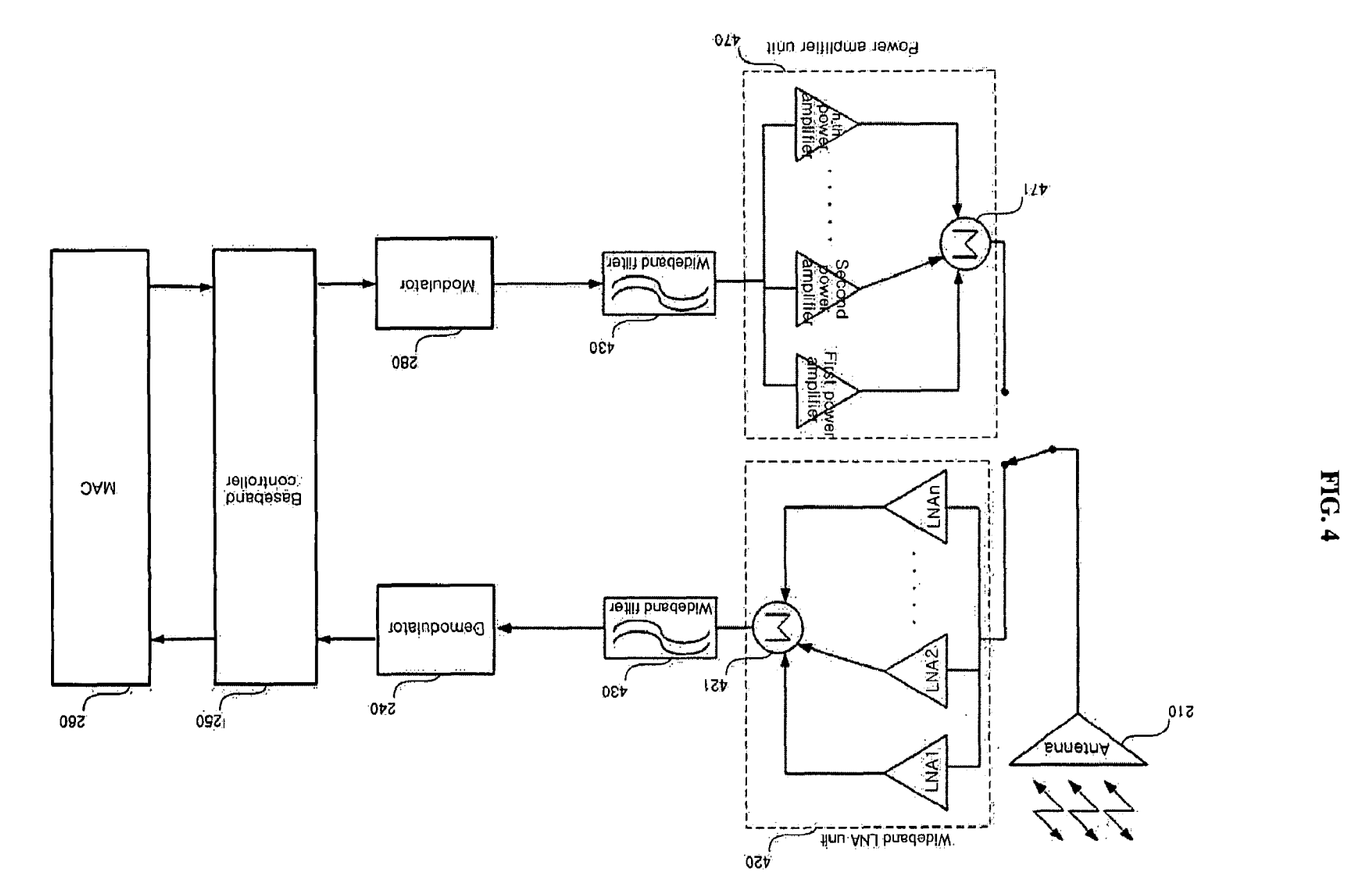
FIG. 4 is a block diagram illustrating a non-limiting exemplary configuration of a UWB transceiver apparatus including a LNA unit with a plurality of LNAs and a power amplifier unit with a plurality of power amplifiers by frequency bands.

FIG. 4 is a block diagram illustrating an exemplary configuration of the UWB transceiver apparatus including the LNA unit with a plurality of LNAs and the power amplifier unit with a plurality of power amplifiers arranged according to the frequency bands. Only the parts different from the UWB transceiver apparatus shown in FIG. 2 are explained in detail herein.

Referring to FIG. 4, the exemplary UWB transceiver apparatus comprises the LNA unit 420 with a plurality of LNAs, the power amplifier unit 470 with a plurality of power amplifiers, the wideband filter 430 covering all the bands of the UWB system, the demodulator 240, the modulator 280, the baseband controller 250, and the MAC 260. The LNA unit 420 includes a plurality of LNAs and a LNA combiner 421 for collecting the outputs from the plurality of LNAs and then sending the outputs to a single port. The power amplifier unit 470 includes a plurality of power amplifiers and a power amplifier combiner 471 for collecting the outputs from the plurality of power amplifiers and then sending the outputs to a single port. Further, the wideband filter 430 covers all the bands used in the UWB system.

When the UWB receiver receives signals, it is designed such that the LNA and power amplifier are not used for a specific frequency band spectrum. Thus, since a band that will not be used upon transmission and reception due to its overlapping with other communication systems is not subjected to an amplification process through the relevant LNA and power amplifier, the UWB system cannot interfere with the existing wireless communication systems and can dynamically cope with interference due to the existing overlapped bands as well as overlapped bands that are likely to appear due to the advent of new communication devices in the future. For example, the filters may be arranged according to the ranges of frequency bands used in the existing wireless communication systems in such a manner that a first LNA and power amplifier are used in the global positioning system (GPS) band and a second LNA and power amplifier are used in the 5 GHz wireless LAN band, for example.

An exemplary implementation that combines the structures of FIGS. 2 and 4 are combined with each other can also be created. In such a combined structure, the transceiver system comprising the filter unit with a plurality of filters, the LNA unit with a plurality of LNAs, and the power amplifier unit with a plurality of power amplifiers are combined. Here, if only interference occurring due to a band overlapping with existing wireless communication systems becomes a problem, the problem can be solved only through the embodiment shown in FIG. 2 or FIG. 4, respectively.

The LNA, the power amplifier, the filter and the like used in the UWB system is required to cover the wideband. Therefore, good performance cannot be uniformly obtained throughout the entire frequency band even though a wideband LNA, filter and power amplifier are used. Further, another problem such as the distortion of signals may be produced in a certain frequency band. On the other hand, if the LNA, filter and power amplifier are provided in each of the frequency bands as described in the exemplary implementations embodying the disclosed teachings, problems such as the distortion of signals will not occur.

Figure 5:
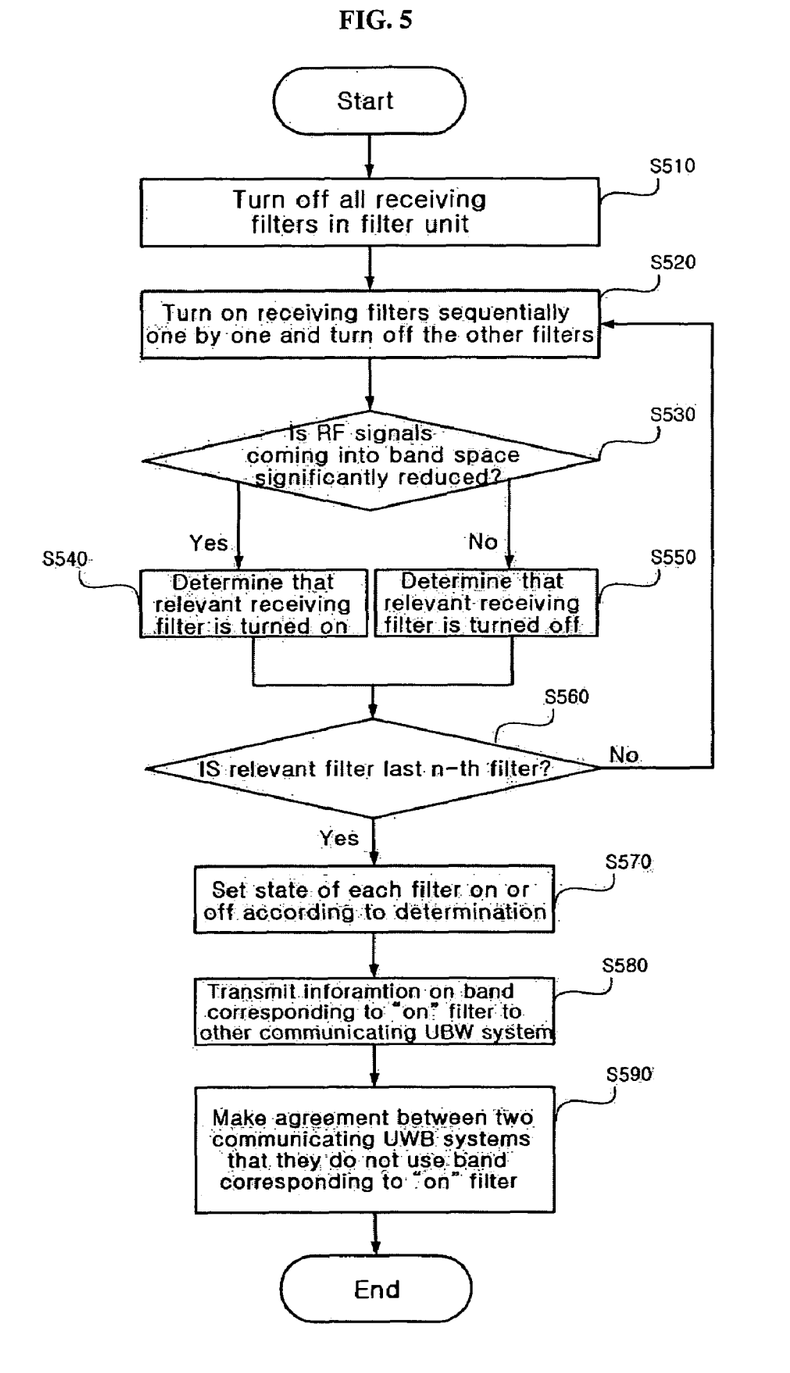
FIG. 5 is a flowchart illustrating a non-limiting exemplary technique for dynamically determining a frequency band to be unused in the UWB transceiver apparatus with a plurality of filters by frequency bands.

FIG. 5 is a flowchart illustrating a technique for dynamically determining a frequency band that is not to be used in the UWB transceiver apparatus using a plurality of filters. The steps in the flowchart of FIG. 5 are performed at a regular interval of time or when the UWB transceiver apparatus is turned on. First, all the filters shown in FIG. 2 are turned off (S510). Then, one of the filters is turned on and the remaining filters remain turned off. Next, the next filter is turned on and the other filters remain turned off. This process is performed for all the filters (S520).

Through the above processes, it is possible to determine as to which bands the interferences occur. For example, where the second filter can cover the 5 GHz wireless LAN band that is currently used by another apparatus, the first to n-th filters are sequentially turned on one by one at a regular interval of time or when the UWB transceiver apparatus is turned on. Then, the total intensity of the RF signals coming into the band space will be significantly lowered when the second filter is turned on. Therefore, the UWB system can perceive the presence of the 5 GHz wireless LAN band through the above process.

Generally speaking, if the power of the RF signals entering the band space is significantly reduced when a specific band stop filter is turned on (S530), it is determined that the filter for use in the band is turned on (S540). Otherwise, it is determined that the relevant filter is turned off (S550). Subsequently, it is checked whether the relevant filter is the last n-th filter (S560). If so, the process goes to next step S570. Otherwise, the process returns to step S520. According to the determined result, the UWB transceiver apparatus turns on only the relevant filters for use in a band from which interference is expected and turns off the other filters (S570). Thus, the UWB board will not be damaged even though higher power is input through the interference band.

Further, information on the relevant band so determined is transmitted to a communicating UWB transceiver apparatus (S580). The two UWB transceiver apparatuses make a mutual agreement that they will not use the relevant band (S590). A method of making an agreement between the two UWB transceiver apparatuses that they will not use a specific band for mutual communication may include a method of producing a management frame in the MAC and transceiving the frame between the apparatuses. Alternately, this information can be included in a physical layer header and communicated to each other during the wireless data transmission/reception. In such a case, a new frame may be produced, or "reserved bits" of the existing frame may be used.

Figure 6:
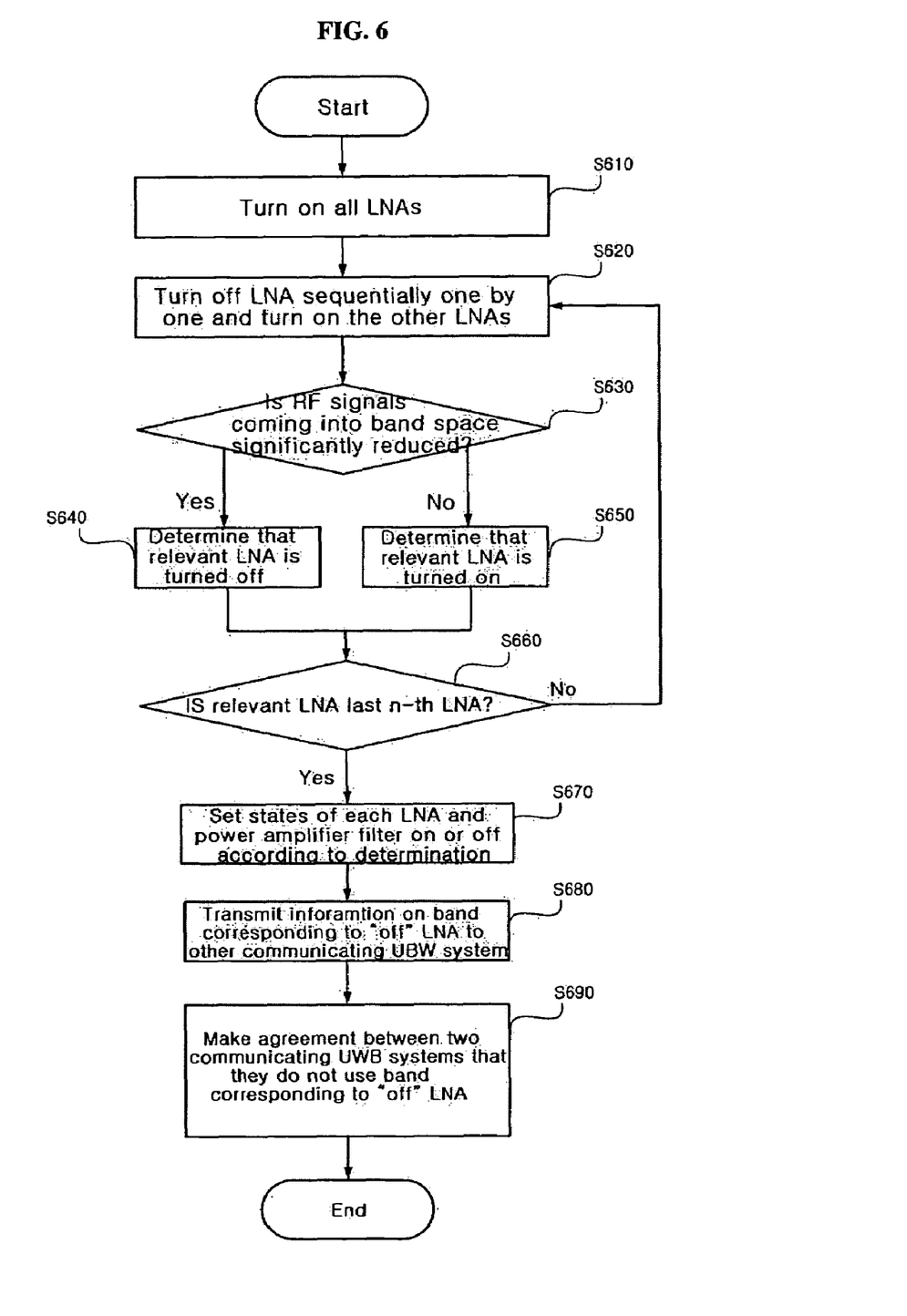
FIG. 6 is a flowchart illustrating a non-limiting exemplary technique for dynamically determining a frequency band to be unused in the UWB transceiver apparatus including a plurality of LNAs and plurality of power amplifiers by frequency bands.

FIG. 6 is a flowchart illustrating an exemplary technique for dynamically determining a frequency band that is not to be used in the UWB transceiver apparatus including a plurality of LNAs and a plurality of power amplifiers. The steps in the flowchart of FIG. 6 are performed at a regular interval of time or when the UWB transceiver apparatus is turned on. First, all the filters shown in FIG. 4 are turned on (S610). Then, one of the filters is turned off and the remaining filters remain turned on. Next, the next filter is turned off and the other filters are turned on. This process is performed for all the filters (S620). Through the above processes, it is possible to determine as to which bands the interferences occur.

As such, if the power of the RF signals entering the band space is significantly reduced when a specific LNA is turned off (S630), it is determined that the LNA for use in the band is turned off (S640). Otherwise, it is determined that the relevant filter and power amplifier are turned on (S650). Subsequently, it is checked whether the relevant LNA is the last n-th LNA (S660). If so, the process goes to step S670. Otherwise, the process returns to step S620. According to the determined result, the UWB transceiver apparatus turns off only the relevant LNA for use in the interference band and turns on the other LNAs (S670). Further, information on the relevant band so determined is transmitted to a communicating UWB transceiver apparatus (S680), and then, the two UWB transceiver apparatuses make a mutual agreement that they will not use the relevant band (S690).

Figure 7:
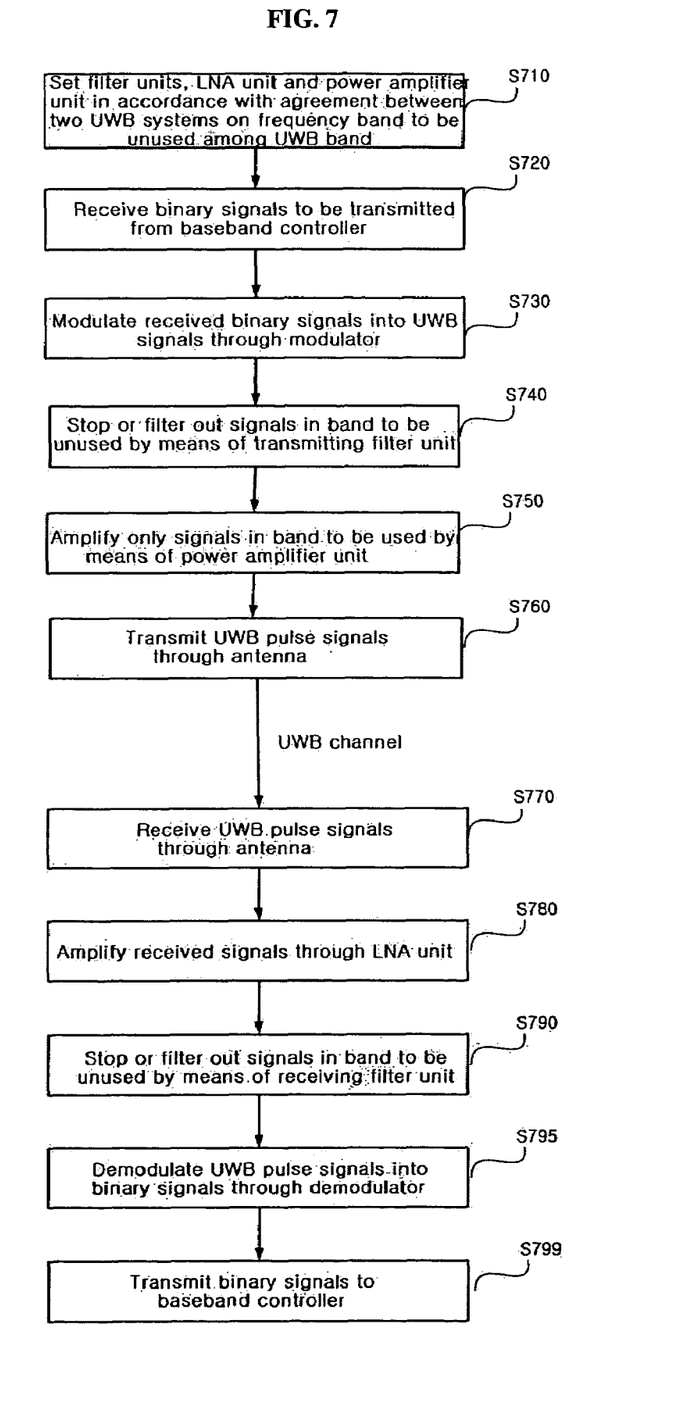
FIG. 7 is a flowchart illustrating a non-limiting exemplary technique of determining a frequency band to be unused and transceiving the signals between UWB systems where the plurality of filters, LNAs and power amplifiers are all used.

FIG. 7 is a flowchart illustrating a process of determining a frequency band not to be used and transceiving signals between the UWB systems where a plurality of filters, LNAs and power amplifiers are all used. First, the filter unit, the LNA unit and the power amplifier unit are set on the basis of the agreement process as described in the embodiment shown in FIG. 5 or FIG. 6 (S710). Then, the modulator of the first UWB transceiver apparatus receives binary signals to be transmitted from the baseband controller (S720). Next, the received binary signals are modulated into UWB pulse signals through the modulator (S730).

Where a carrier is used, the signals should first pass through a down converter and be then subject to the modulation process. Otherwise, the signals are directly transmitted to the modulator. The modulated signals pass through the filter unit on the transmitting side of the UWB system, in which the signals in the band to be unused are filtered out or stopped (S740). Thereafter, only the signals in the band to be used are amplified through the power amplifier unit (S750), and the UWB pulse signals are then transmitted through the antenna (S760).

The transmitted signals are propagated through the UWB channel in the air and are received through the antenna of the second UWB transceiver apparatus (S770). Then, the received signals are amplified by passing through the LNA unit (S780), and the signals in the band not to be used are filtered out or stopped through the filter unit on the receiving side of the UWB system (S790). Only the filtered pulse signals are demodulated into binary signals (S795). Where a carrier is used, the pulse signals should pass through the filter unit and then be transmitted to the down converter. Where a carrier is not used, the pulse signals are directly sent to the demodulator. The binary signals having passed through the demodulator are transmitted to the baseband controller (S799).

Although the disclosed teachings have been described in connection with the disclosed embodiments thereof, it is not limited to these embodiments thereof. Therefore, it is apparent to those skilled in the art that various changes and modifications can be made thereto without departing from the scope and spirit of the present invention defined by the appended claims.

What is claimed is:

1. A ultra wide band receiver comprising:
   a plurality of communication modules with limited working bands whose on/off states can be controlled;
   wherein the ultra wide band receiver is adapted to detect power intensity of a received radio signal in the limited working bands based on on/off states of said plurality of communication modules, and
   wherein the ultra wide band receiver is adapted to control the on/off states of the plurality of communication modulea based on a result of the detection,
   wherein the said plurality of communication modules are a plurality of band stop filters or plurality of small signal amplifiers.

2. The ultra wide band receiver of claim 1, wherein the detected power intensity corresponds to a band that comprises a frequency at which interference is expected.

3. The ultra wide band receiver of claim 1, further comprising:
   a baseband controller adapted to control the on/off states of said plurality of communication modules, to detect the power intensity of the radio receive signals, and to control the on/off states of the plurality of communication modules.

4. The ultra wide band receiver of claim 3, further comprising an MAC for storing information on the detected band and transmitting the stored information on the band to other ultra wide band receivers.

5. The ultra wide band receiver of claim 4, wherein the information on the band is transmitted through a management frame.

6. The ultra wide band receiver of claim 4, wherein the information on the band is stored in a physical layer header.

7. A ultra wide band transceiver, comprising:
   a plurality of communication modules;
   wherein the ultra wide band transceiver is adapted to detect power intensity of a radio receive signal by bands according to on/off states of the plurality of communication modules with predetermined limited working bands, and,
   further adapted to control the on/off states of the plurality of communication modules based on the detection result, to filter out a radio receive/transmission signal in a corresponding band
   wherein the said plurality of communication modules are a plurality of band stop filters or a plurality of small signal amplifiers.

8. The ultra wide band transceiver of claim 7 wherein the band comprises a frequency at which interference is expected.

9. The ultra wide band transceiver of claim 7, comprising:
a baseband controller adapted to control the on/off states of the plurality of communication modules, and
further adapted to detect the power intensity of the radio receive signal in accordance with the control, and to control the on/off states of the plurality of communication modules according to the detection result.

10. The ultra wide band transceiver of claim 9, wherein the baseband controller comprises a power control unit for controlling intensity of transmission power of the radio transmission signal according to a signal to noise ratio (SNR) of the radio receive signal.

11. The ultra wide band transceiver of claim 9, further comprising an MAC for storing information on the band and transmitting the stored information on the band to other ultra wide band receivers.

12. The ultra wide band transceiver of claim 11, wherein the information on the band is transmitted through a management frame.

13. The ultra wide band transceiver of claim 11, wherein the information on the band is stored in a physical layer header.

14. A method of receiving ultra wide band signals, comprising:
detecting power intensity of a radio receive signal according to on/off states of a plurality of communication modules with limited working bands;
controlling the on/off states of the plurality of communication modules in accordance with the detection result; and
filtering out the radio receive signal in the band,
wherein the said plurality of communication modules are a plurality of band stop filters or a plurality of small signal amplifiers.

15. The method of claim 14, wherein the band comprises a frequency at which interference is expected.

16. The method of claim 14, wherein the step of controlling the on/off states of the plurality of communication modules includes setting the on or off state according to the detection result of the power intensity.

17. A method of transceiving ultra wide band signals, comprising:
detecting power intensity of a radio receive signal according to on/off states of a plurality of communication modules with limited working bands;
controlling the on/off states of the plurality of communication module a in accordance with the detection result; and
filtering out a radio receive/transmission signal in a band;
wherein the said plurality of communication modules are a plurality of band stop filters or a plurality of small signal amplifiers.

18. The method of claim 17, wherein the step of controlling the on/off states of the plurality of communication modules includes:
setting on/off state of the at least one communication module according to the detection result of the power intensity; and
making an agreement on the determination result with at least one other communicating ultra wide band system.

19. The method of claim 18, wherein the step of making an agreement on the set result includes:
storing information on the determination result; and
transmitting the stored information to the other ultra wide band receiver.

* * * * *